US011880890B2

(12) United States Patent
Das et al.

(10) Patent No.: US 11,880,890 B2
(45) Date of Patent: Jan. 23, 2024

(54) DETECTING MONEY LAUNDERING ACTIVITIES USING DRIFT IN A TRAINED SIAMESE NEURAL NETWORK

(71) Applicant: MASTERCARD INTERNATIONAL INCORPORATED, Purchase, NY (US)

(72) Inventors: Debasmita Das, Kolkata (IN); Sonali Syngal, Gurgaon (IN); Ankur Saraswat, Gurgaon (IN); Garima Arora, Delhi (IN); Nishant Pant, Dehradun (IN); Yatin Katyal, Rohtak (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 123 days.

(21) Appl. No.: 17/170,422

(22) Filed: Feb. 8, 2021

(65) Prior Publication Data

US 2022/0253950 A1 Aug. 11, 2022

(51) Int. Cl.
*G06Q 40/12* (2023.01)
*G06N 3/049* (2023.01)
*G06N 3/045* (2023.01)

(52) U.S. Cl.
CPC ........... *G06Q 40/12* (2013.12); *G06N 3/045* (2023.01); *G06N 3/049* (2013.01)

(58) Field of Classification Search
None
See application file for complete search history.

(56) References Cited

U.S. PATENT DOCUMENTS

| 11,178,169 | B2 * | 11/2021 | Shafet | H04L 63/1416 |
| 2002/0174346 | A1 * | 11/2002 | Ting | G06F 21/57 |
| | | | | 713/186 |
| 2014/0289179 | A1 * | 9/2014 | Di Castro | G06G 7/163 |
| | | | | 708/835 |

(Continued)

OTHER PUBLICATIONS

Graves, "Generating Sequences with Recurrent Neural Networks", University of Toronto, Jun. 5, 2014, URL, https://arxiv.org/pdf/1308.0850.pdf.

*Primary Examiner* — Fateh M Obaid
(74) *Attorney, Agent, or Firm* — LOZA & LOZA, LLP; Julio Loza

(57) ABSTRACT

Siamese neural networks (SNN) are configured to detect differences between financial transactions for multiple financial institutions and transactions for a target party. A first neural network of the SNN tracks transactions (target transactions) for a particular customer or financial institution over time and provides a target output vector. Similarly, a second neural network of the SNN tracks transactions (baseline transactions) for all or a plurality of financial institutions (e.g., within a region) over the same period of time and provides a baseline output vector. The transactions for all or a plurality of financial institutions act as a baseline of transactions against which potentially fraudulent or money laundering activity may be compared. Because Siamese neural networks account for temporal changes based on the baseline of transactions, sudden changes in target transactions will only trigger an alarm if such changes (e.g., deviations or drifts) are relative to a baseline of transactions.

17 Claims, 11 Drawing Sheets

(56) References Cited

U.S. PATENT DOCUMENTS

| | | | |
|---|---|---|---|
| 2018/0075344 A1* | 3/2018 | Ma | G06N 3/0481 |
| 2018/0225564 A1* | 8/2018 | Haiut | G06F 30/20 |
| 2019/0164245 A1* | 5/2019 | Takacs | G06Q 30/0205 |
| 2020/0005196 A1* | 1/2020 | Cai | G06F 16/9535 |
| 2020/0213346 A1* | 7/2020 | Shafet | G06F 16/953 |
| 2021/0142478 A1* | 5/2021 | Abhinav | G06N 20/00 |
| 2021/0397610 A1* | 12/2021 | Singh | G06N 7/005 |
| 2022/0019876 A1* | 1/2022 | Kim | G06F 9/3001 |

* cited by examiner

DETECTING MONEY LAUNDERING ACTIVITIES USING DRIFT IN A TRAINED SIAMESE NEURAL NETWORK

TECHNICAL FIELD

The technology discussed below relates generally to anti money laundering techniques, and more particularly, to methods for detecting and/or assessing money laundering activity hidden by a large volume of legitimate transactions.

INTRODUCTION

Money laundering is the practice of engaging in specific financial transactions in order to conceal the identity, source, and/or destination of money from regulatory agencies and/or law enforcement. The term "money laundering" may encompass any financial transaction that generates an asset or a value as the result of an illegal act.

Anti-money laundering (AML), as used in the finance and legal industries, refers to legal controls that require financial institutions and other regulated entities to prevent or report money laundering activities. For example, financial institutions must monitor financial transactions, identify the customers and parties in those transaction, and the use, source, and/or destination of funds in such transactions to confirm that they are not involved in money laundering.

However, detecting money laundering activities is hindered by various factors, including, active concealment by the parties, the large volume of transactions performed by financial institutions, and the difficulty of tracking money laundering activity across multiple financial institutions. Therefore, it would be beneficial to find a way to effectively identify, monitor, and/or detect potential money laundering activities from among a large volume of financial transactions.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to a method for detecting anomalous financial activity, such as fraudulent activity or money laundering activity. A first plurality of financial transactions for a target party is used to obtain a target vector. A second plurality of financial transactions for a plurality of parties may serve to obtain a baseline vector.

A first output vector may be generated using the target vector as input to a first network of a Siamese neural network. Similarly, a second output vector may be generated using the baseline vector as input to a second network of the Siamese neural network. A vector distance is then obtained between the first output vector and the second output vector.

In one example, each for the first network and the second network is a bidirectional long short term memory (LSTM) recurrent neural network. Each of the first network and the second network may be identical networks that are configured to use the same weights and parameters within and between layers of the first network and the second network. Each of the first network and the second network may have a retained memory of n previous time steps which serve to generate the first output vector and the second output vector.

According to one aspect, the first plurality of financial transactions in the target vector may include financial transactions for a current time period as well as financial transactions for a plurality of L previous time periods, and the second plurality of financial transactions in the baseline vector may include financial transactions for the current time period as well as financial transactions for the same plurality of L previous time periods.

The method may further include selecting the plurality of parties to be similarly situated as the target party. For instance, the plurality of parties and the target party may be in at least one of: the same geographical region, the same business sector or industry, or the same demographic group.

In some implementations, the first plurality of financial transactions and the second plurality of financial transactions may be selected to be within the same time period. In other implementations, the first plurality of financial transactions and the second plurality of financial transactions may be selected to be of a same transaction type. In another example, the first plurality of financial transactions and the second plurality of financial transactions may be selected to be within the same time period and of the same transaction type.

The method may further include training the Siamese neural network based on a plurality of sample transactions to detect differences between legitimate financial transactions and potentially money laundering financial transactions.

A drift score is generated from the vector distance, the drift score indicative of how much the first plurality of financial transactions in the target vector vary from the second plurality of financial transactions in the baseline vector. In one example, the drift score may be constrained within a learned discriminative space defining money laundering transactions and non-money laundering transactions. For instance, the vector distance may be normalized within a defined range (e.g., 0 to 1) to obtain the drift score.

An alarm message is provided if the drift score indicates potential fraudulent or money laundering activity by the target party. For instance, the alarm message may be provided if the drift scores falls within a range associated with potential fraudulent or money laundering activity.

According to one aspect, the alarm message may be provided only if the drift score and a plurality of immediately preceding drift scores for the same target party, in combination, indicate potential fraudulent or money laundering activity by the target party. For example, the alarm message may be provided if two or more of the drift scores fall within a range associated with potential fraudulent or money laundering activity. According to one feature, the drift score generated from the vector distance may be based on the first plurality of financial transactions includes financial transactions for a current time period as well as financial transactions for a plurality of L previous time periods, and the plurality of immediately preceding drift scores for the same target party include a previous drift score comprising financial transactions for a previous time period as well as financial transactions for L prior time periods.

According to another exemplary implementation, a non-transitory computer-readable storage medium having instructions thereon, wherein the instructions, when executed by a processing circuit, cause the processing circuit to: (a) obtain a target vector from a first plurality of financial transactions for a target party; (b) obtain a baseline vector from a second plurality of financial transactions for a plurality of parties; (c) generate a first output vector using the target vector as input to a first network of a Siamese neural network; (d) generate a second output vector using the baseline vector as input to a second network of the Siamese neural network; (e) obtain a vector distance between the first output vector and the second output vector; (f) generate a drift score from the vector distance, the drift score indicative of how much the first plurality of financial transactions in the target vector vary from the second plurality of financial transactions in the baseline vector; and/or (g) provide an alarm message if the drift score indicates potential fraudulent or money laundering activity by the target party.

According to another exemplary implementation, a server is provided comprising at least one processor, a communication interface communicatively coupled to the at least one processor, and a memory communicatively coupled to the at least one processor. The at least one processor may be configured to: (a) obtain a target vector from a first plurality of financial transactions for a target party; (b) obtain a baseline vector from a second plurality of financial transactions for a plurality of parties; (c) generate a first output vector using the target vector as input to a first network of a Siamese neural network; (d) generate a second output vector using the baseline vector as input to a second network of the Siamese neural network; (e) obtain a vector distance between the first output vector and the second output vector; (f) generate a drift score from the vector distance, the drift score indicative of how much the first plurality of financial transactions in the target vector vary from the second plurality of financial transactions in the baseline vector; and/or (g) provide an alarm message if the drift score indicates potential fraudulent or money laundering activity by the target party.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
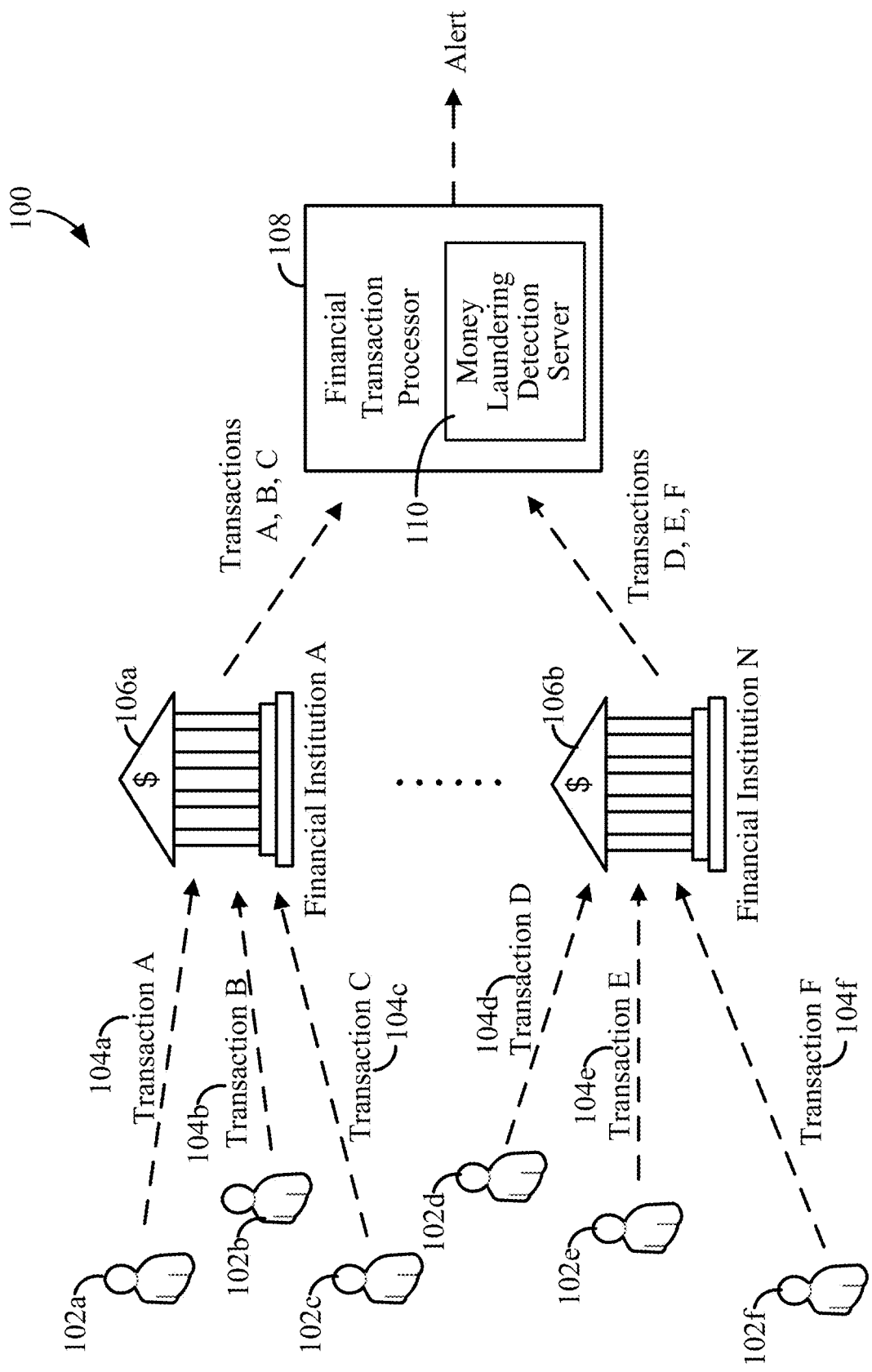
FIG. 1 is a diagram illustrating an exemplary operating environment in which a financial transaction processor may monitor and detect money laundering activities.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Money laundering is a global problem that poses a significant threat to financial institutions. Consequently, anti-money laundering (AML) regulations have been imposed by governments and/or regulatory agencies on financial institutions. These AML regulations require financial institutions to monitor, detect, and/or report such potential money laundering transactions. However, it is very difficult to capture in real time whether any suspicious money laundering activities are occurring at a particular financial institution. First, parties involved in money laundering may actively conceal such activities, for example, by maintaining financial transaction amounts below trigger thresholds, sending random or varying amounts in each transaction, and/or using various financial transaction types to try to avoid detection or tracking. Secondly, the mere volume of daily financial transactions performed by many financial institutions, often hundreds of thousands or millions per day, makes it difficult to those individual financial institutions makes it very difficult for such money laundering transactions to be tracked. Third, it is even more difficult for most financial institutions to track money laundering activities where such activities are spread across multiple different financial institutions (e.g., one financial institution does not know of the transactions done by other financial institutions).

Many current AML solutions focus on the detection of transactions that look suspicious. These solutions usually employ various algorithms to try to identify which transactions should be flagged for further review. The problem with these AML solutions is that while they may adequately detect certain suspicious financial transactions, they do not take into account significant factors that can affect an appropriate evaluation of the risk exposures. For instance, they do not effectively identify, monitor, and/or detect potential money laundering activities from among a large volume of financial transactions. Thus, these money laundering activities may remain hidden under the millions of legitimate transactions that are occurring daily. Thus, it is not possible to identify the money laundering activities when viewed from a larger space.

According to one aspect described herein, a financial transaction processor, such as Mastercard®, VISA®, Discover®, American Express®, etc., may have access to financial transactions from multiple different financial institutions. The financial transaction processor may collect financial transaction information from these financial institutions over time, and continuously compares transactions for a particular customer or financial institution to the overall transaction activities for a particular region. By noting differences between the transactions for a particular customer or financial institution to the overall transactions for the region, the financial transaction processor is then able to ascertain whether suspicious money laundering activities may be occurring.

According to one aspect, the financial transaction processor may use twin or Siamese neural networks to detect differences between financial transactions for multiple financial institutions and transactions for a target party. A first neural network may serve to track transactions (target transactions) for a particular customer or financial institution over time and provides a target output vector. The target output vector may represent the likelihood that the target transactions involve AML activity. Similarly, a second neural network may serve to track transactions (baseline transactions) for all or a plurality of financial institutions (e.g., within a region) over the same period of time and provides a baseline output vector. The baseline output vector may represent the likelihood that the baseline transactions involve AML activity. The transactions for all or a plurality of financial institutions act as a baseline of transactions against which potentially fraudulent (e.g., illegal, illicit, etc.) or money laundering activity may be compared. Because Siamese neural networks account for temporal changes based on the baseline of transactions, sudden changes in target transactions will only trigger an alarm if such changes (e.g., deviations or drifts) are relative to a baseline of transactions. Consequently, a distance vector is obtained between the target output vector and the baseline output vector.

According to another aspect, a drift score may be calculated based on the distance vector, the drift score constrained may be within a learned discriminative space defining non-AML transactions and AML transactions. For instance, the discriminative space may be between 0 (or 0%), representing AML activity, and 1 (or 100%), representing non-AML activity. In this instance, a drift score moving toward 0 would indicate AML activity may have been detected. If the drift score is below a threshold (e.g., a threshold below which AML activity is indicated), then an alarm message may be triggered (e.g., sent, displayed, etc.) indicating anomalous transaction activity for a target party associated with the target output vector.

FIG. 1 is a diagram illustrating an exemplary operating environment 100 in which a financial transaction processor 108 may monitor and detect money laundering activities. In this example, financial transactions 104 may be collected by the financial transaction processor 108 from multiple different financial institutions 106. Multiple different parties 102a-f (e.g., customers, individuals, entities, businesses, etc.) may perform financial transactions 104a-f with multiple financial institutions 106a and 106b. These transactions may be forwarded to, or sent through, the financial transaction processor 108. Thus, the financial transaction processor 108 is able to collect, monitor, and/or process these financial transactions 104.

In various implementations, the financial institution 106 may include banks (including automated teller machines), credit unions, online payment services (e.g., Paypal®, Google Wallet®, etc.), point-of-sale devices (e.g., credit card readers), among others. Such financial institutions 106 may be electronically connected with each other through networks and/or intermediate processors to process transactions.

In various examples, the financial transactions 104 may be performed in person at a financial institution (e.g., using cash, currency, checks, etc.), electronically through the internet using a web portal, via a network or collection of systems used for transfer of funds through use of cash-substitutes. The financial transactions 104 may include product or service purchases, credit purchases, debit transactions, fund transfers, account withdrawals, etc., using cash, credit cards, cash cards, letters of credit, checks, wires, automated clearing house (ACH), cryptocurrencies, cash-alternatives, etc. Examples of networks or systems configured to perform as financial transaction processors 108 (e.g., payment processors) may include those operated by Mastercard®, VISA®, Discover®, American Express®, etc.

In one example, the financial transaction processor 108 may include a money laundering detection server 110 configured to detect potential money laundering activities from among all of the financial transactions 104 collected from the multiple financial institutions 106. In one example, the money laundering detection server 110 may implement one or more neural networks that are configured to identify suspicious activity from financial transactions over a period of time. This may be done by comparing features (e.g., drift, divergence, etc.) between transactions collected within a region versus transactions for a particular customer or financial institution over a period of time.

In one example, a twin or Siamese neural network may be trained to reduce the alert of potential money laundering into a discriminative embedding space for the Siamese neural networks for anti-money laundering (AML) detection. This may be done by reducing account and market level data to a learned discriminative space, where higher deviation indicates money laundering activity.

Figure 2:
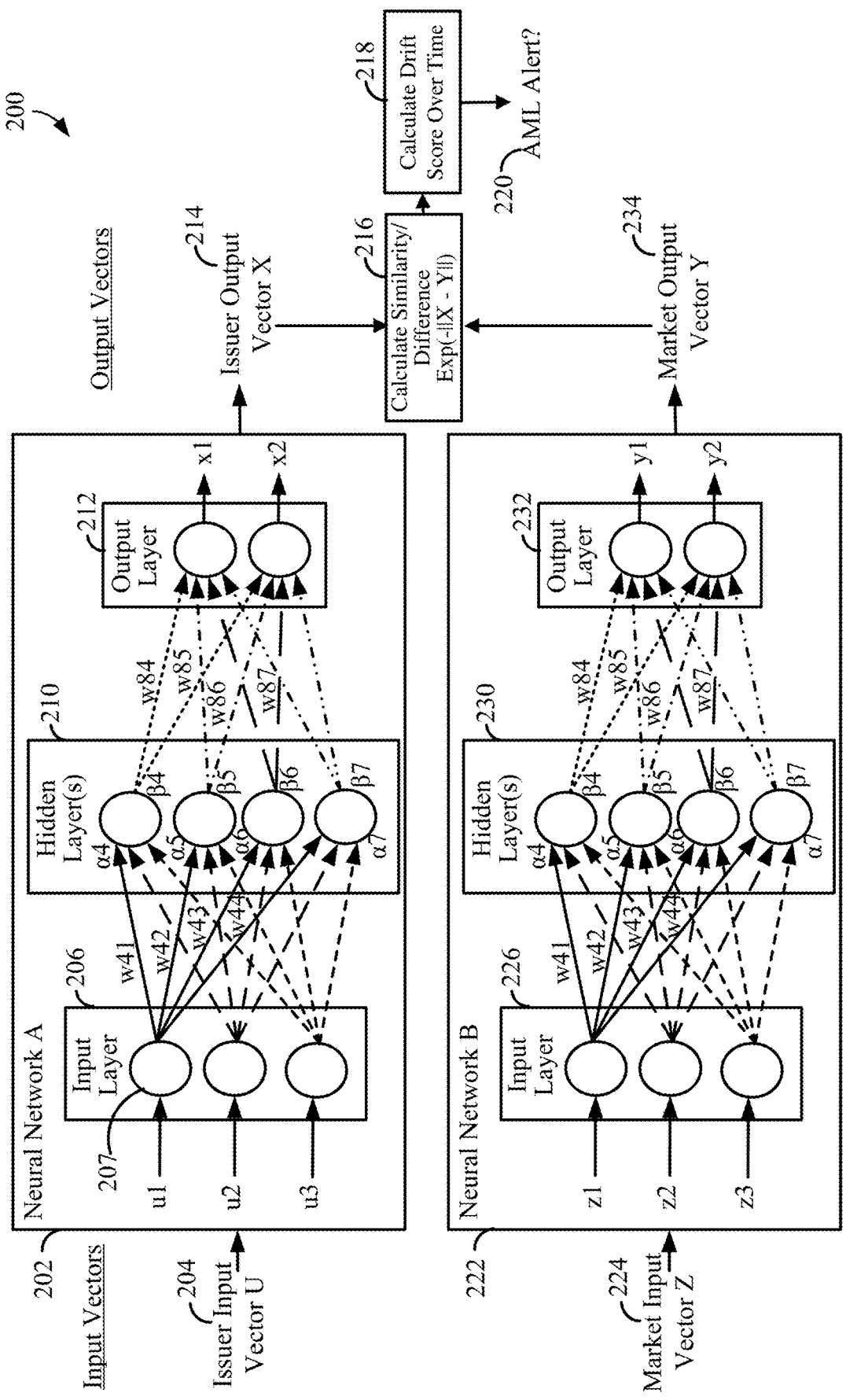
FIG. 2 is a block diagram illustrating an example of a twin or Siamese neural network (SNN) configured to detect potential money laundering activity.

FIG. 2 is a block diagram illustrating an example of a twin or Siamese neural network (SNN) 200 configured to detect potential money laundering activity. A Siamese neural network is a type of artificial neural network architecture that includes two or more identical subnetworks. The identical subnetworks have the same configuration and use the same parameters and weights. Parameter updating is mirrored across both subnetworks. The Siamese neural network may serve to identify similarities, differences, and/or a relationship between two comparable input vectors. In one example, a distance between two corresponding output vectors, as measured over time, may serve to detect potential money laundering activities.

Generally, the twin or Siamese neural network 200 may include a first neural network 202 and a second neural network 222, which may be recurrent neural networks (RNN). RNNs are capable of dynamically learning dependencies between spatially correlated data, which facilitate the processing of temporal information, i.e., time-dependent patterns in the sense that a value at a given time depends on past values. That is, the output at time $t_i$ affects the input at a subsequent time $t_i+1$. In this manner, RNNs keep two kinds of input, i.e., values in a current input vector, and values in preceding input vectors, to produce a new output vector for the for the new data.

With recurrent neural networks, each of the first and second neural networks 202 and 222 may include an input layer 206 and 226, one or more hidden/internal layers 210 and 230, and an output layer 212 and 232, respectively. Each layer may have a plurality of nodes 207. Nodes 207 may be input nodes (receiving data from outside of the network), output nodes (yielding results), or hidden nodes (that modify the data from input to output). It should be understood that the number of nodes illustrated in the input layers 206 and 226, the hidden layers 210 and 230, and the output layers 212 and 232 are illustrative and various different numbers of nodes may be used in other implementations for each layer. Each node 207 in a given layer is connected with a directed (one-way) connection to every other node in the next successive layer. Each node may have a time-varying real-valued activation. Each connection between nodes in different layers 206, 210, and 212 or 226, 230, and 232 may have a modifiable real-valued weight (w).

In this example, an issuer input vector U 204 may serve as an input to the first neural network 202 and a market input vector Z 224 may serve as an input to the second neural network 222, where the first and second neural networks 202 and 222 are Siamese neural networks and use the same parameters (e.g., $\alpha i$ and $\beta i$) and weights (e.g., w). The issuer input vector U 204 may comprise financial transactions (e.g., amounts of transactions, frequency of transactions, date of each transaction, type of transaction, etc.) for a particular customer, party, or financial institution over a defined period of time. Similarly, the market input vector Z 224 may comprise the financial transactions for all or multiple customers, parties, or financial institutions (e.g., within a state, region, country, or demographic group) during the same defined period. The first and second neural networks 202 and 222 process the input vectors U 204 and Z 224 and provide output vectors X 214 and Y 234, respectively. A distance between the output vectors X 214 and Y 234 may be calculated 216 for each time period (e.g., the exponential of the difference between output vectors X and Y). The distance between the output vectors X 214 and Y 234 may provide an indication of their similarity or difference at a given point in time. Then, a drift score 218 may be calculated based on previous distances calculated for between output vectors X 214 and Y 234 at earlier points in time. That is, a deviation in the distances between output vectors X 214 and Y 234 over time may be referred to as a drift. A drift, greater than a certain threshold amount, may be indicative of money laundering activity, by the party associated with the issuer input vector U 204, and may trigger an AML alert 220. Using such drift to detect potential money laundering activities is based on an understanding that changes in financial transactions for a particular party that deviate, more than a threshold amount or percentage, from financial transactions for the market output vector Z 224 are a rare occurrence and should be scrutinized. The use of Siamese neural networks to detect such changes help discern variations in financial transactions for a particular party over time and relative to all or a subset of financial transactions for the "market" of comparable parties or financial institutions.

In one implementation, the financial transactions making up the issuer input vector U 204 may be all or just a subset of financial transactions for a party of interest (e.g., a particular customer, business, and/or financial institution). The corresponding market vector Z 224 is made up of similar financial transactions as used for the issuer vector U 204. In one example, all financial transactions for a particular party, for a specific period of time, may be used in the issuer input vector U 204 and, thus, all financial transactions for the same specific period of time for all parties may be used in the market input vector Z 224. In other examples, the market input vector Z 224 may be restricted to financial transactions occurring within the same region, state, or country as the party whose financial transactions make up the issuer vector. In yet another example, the market input vector Z 224 may be restricted to financial transactions performed by similar parties as the party of interest whose financial transactions make up the issuer input vector U 204. For instance, if the party of interest is an individual, then only financial transactions for individuals may be used in the market input vector Z 224. Alternatively, if the party of interest is a business, then only financial transactions for businesses may be used in the market vector Z 224. In various other examples, the financial transactions in the issuer input vector U 204 and market input vector Z 224 may be limited to the same type of transactions, e.g., deposit transaction, withdrawal transactions, credit card transactions, wire transactions, etc.

Note that in one implementation, at least some of the financial transactions within the issuer input vector U 204 may be the source of the suspected money laundering activity (e.g., such financial transactions are being used to launder money). In other implementations, the financial transactions within the issuer input vector U 204 may only be indirectly tied to money laundering transactions. For example, a drift associated with how much a party spends over the course of a period of time (e.g., weeks, months, years, etc.) may be indicative of unusual spending and may be indirectly tied to potential money laundering activities (e.g., the financial transactions themselves are not part of the money laundering activity).

Figure 3:
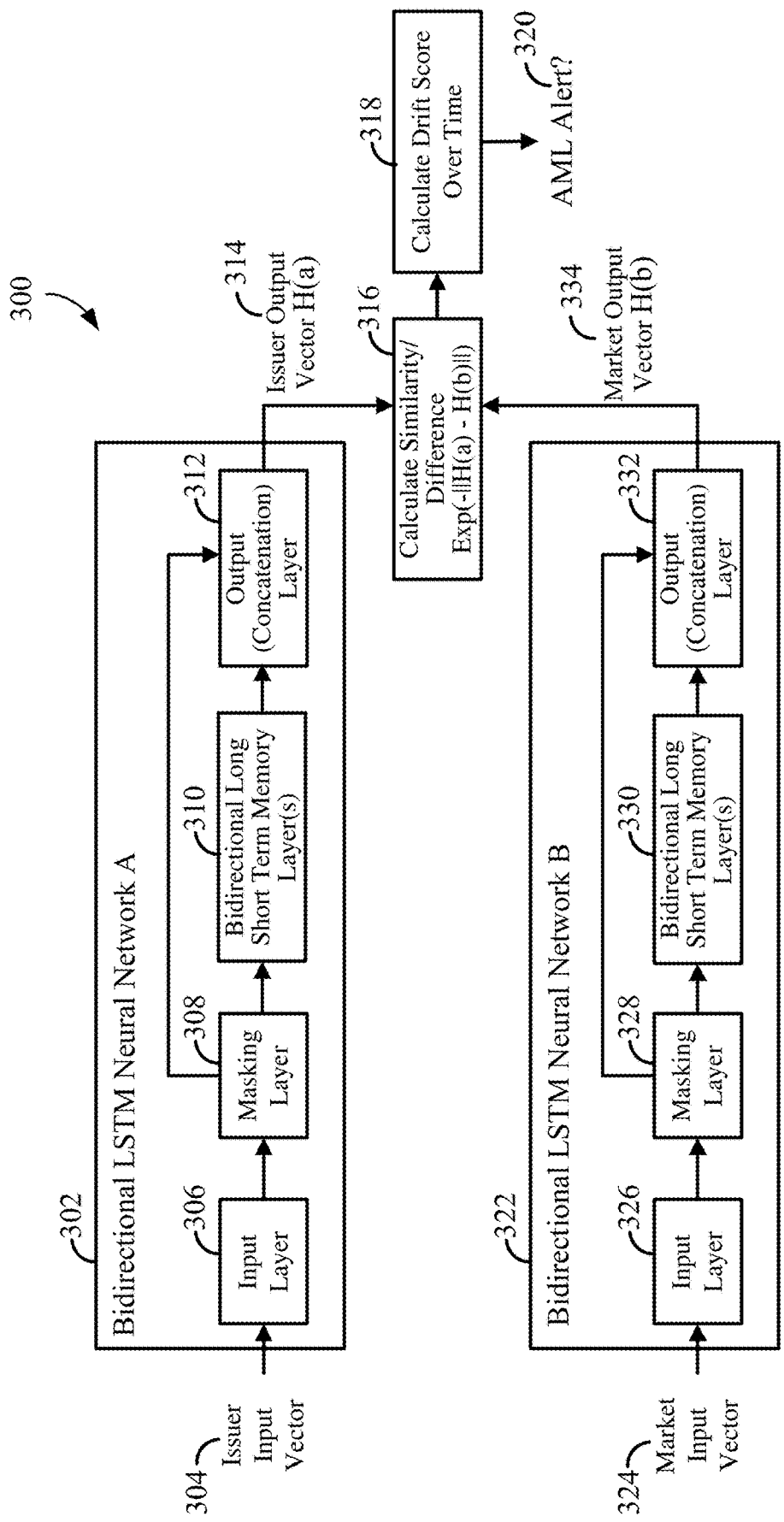
FIG. 3 is a block diagram illustrating one implementation of a twin or Siamese neural network (SNN), comprising bidirectional long short term memory (LSTM) recurrent neural networks (RNN), configured to detect potential money laundering activity.

FIG. 3 is a block diagram illustrating one implementation of a twin or Siamese neural network (SNN) 300, comprising bidirectional long short term memory (LSTM) recurrent neural networks (RNN), configured to detect potential money laundering activity. Similar to the example in FIG. 2, the Siamese neural network (SNN) 300 may include a first bidirectional LSTM RNN 302 and a second bidirectional LSTM RNN 322. A bidirectional long short term memory (LSTM) recurrent neural network is a special type of recurrent neural network (RNN) that is described in Graves, *Generating Sequences with Recurrent Neural Networks*, available at https://arxiv.org/pdf/1308.0850.pdf. A directional recurrent neural network essentially puts two independent RNNs together, allowing the networks to have both backward and forward information about the sequence at every time step. A bidirectional LSTM RNN allows running inputs in two ways, one from past to future and one from future to past. The LSTM that runs backward preserves information from the future. Using the states in the hidden layers allows the bidirectional LSTM recurrent neural network to preserve information from both past and future. The bidirectional LSTM recurrent neural network learns bidirectional long-term dependencies between time steps of a sequence data (e.g., financial transactions). The length of memory for such neural networks may be defined by the number of previous time steps (e.g., states) maintained or remembered by the bidirectional LSTM RNN (e.g., within multiple nodes and/or layers of the network).

In one example, the first bidirectional LSTM RNN 302 may include an input layer 306, a masking layer 308, one or more bidirectional long short term memory layers 310, and an output or concatenation layer 312. Similarly, the second bidirectional LSTM RNN 322 may also include an input layer 326, a masking layer 328, one or more bidirectional long short term memory layers 330, and an output or concatenation layer 332.

Figure 4:
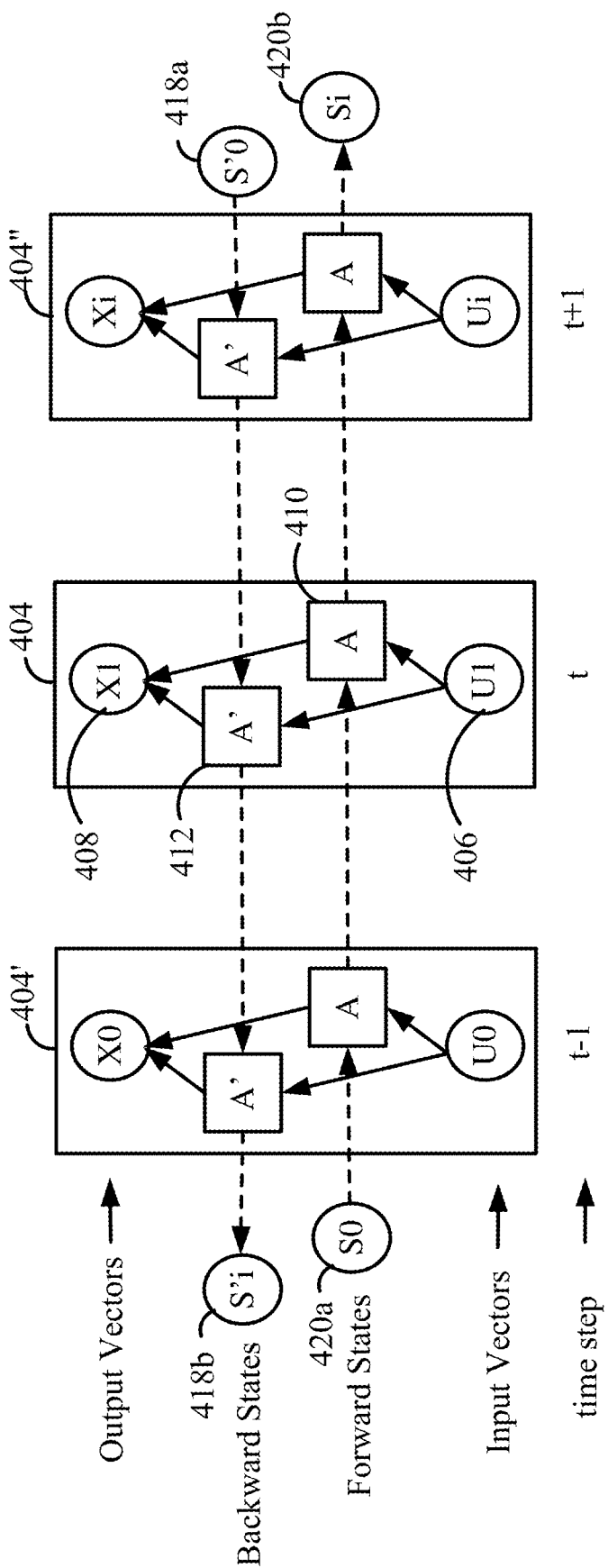
FIG. 4 illustrates an example of a bidirectional RNN in which outputs are based on accumulation of states in both past and future context.

FIG. 4 illustrates an example of a bidirectional RNN in which outputs are based on accumulation of states in both past and future context. A similar bidirectional RNN may be implemented by the first bidirectional LSTM RNN 302 and the second bidirectional LSTM RNN 322. This diagram illustrates the same bidirectional RNN at three different times steps t−1, t, and t+1. At a given time t (or computational period), a bidirectional RNN 404 receives an input vector U1 406, which serves as input to a forward path neural network 410 and a backward path neural network 412 (e.g., accumulators of states), and provide an output vector X1 408. Similarly, at a previous time t−1 (or computational period), the bidirectional RNN 404' receives an input vector U0, which serves as input to the forward path neural network and the backward path neural network (e.g., accumulators of states), and provide an output vector X0. Likewise, at a subsequent time t+1 (or computational period), the bidirectional RNN 404" receives an input vector Ui, which serves as input to the forward path neural network and the backward path neural network (e.g., accumulators of states), and provide an output vector Ui. Forward path neural network states S0 to Si and backward path neural network states S'0 to S'i are accumulated at each time period.

Referring again to FIG. 3, the first bidirectional LSTM RNN 302 and second bidirectional LSTM RNN 322 may be identical networks, having the same layers with the same parameters and weights. However, different data sequences may be input vectors into each of these networks. For instance, the first bidirectional LSTM RNN 302 may receive an issuer input vector 304, which includes financial transactions for a target party (e.g., a customer, financial institution, bank, etc.), and provides an issuer output vector H(a) 314. Similarly, the second bidirectional LSTM RNN 322 may receive a market input vector 324, which includes financial transactions for all or a subset of parties (e.g., multiple customers, financial institutions, banks, etc.), and provides a market output vector H(b) 334. Each input vector 304 and 324 may comprise, for example, amounts of financial transactions (e.g., [$345.21, $23.45, $56.10, $2.43, $67.95, $1425.00, . . . ] executed during a period of time (e.g., days, weeks, months, years, etc.). In some implementations, the financial transactions may be all financial transactions occurring in an account (e.g., checking account, credit card, etc.) during the defined period of time. In other instances, the financial transactions may be limited or restricted by the type of transaction (e.g., purchase, deposit, wire, etc.) occurring on a type of account (e.g., credit card, bank account, etc.).

A distance between the output vectors H(a) 314 and H(b) 334 may be calculated 316. That is, the market output vector H(b) 334 is a baseline against which the issuer output vector H(a) is compared. In one example, an exponent of the negative of this distance (Exp(−∥H(a)−H(b)∥)) may serve to denote the similarity or difference between the two output vectors H(a) and H(b). A drift score, in the range of 1 to 0 may be obtained based on this similarity or difference between the output vectors. For instance, a 1 may denote no drift from the market while a 0 may denote 100% drift from the market. Drift scores between 0 and 1 would denote different degrees of drift from the market. This drift score may also be represented in terms of a percentage (e.g., 0=0%, 0.10=10%, 0.45=45%, 0.73=73%, and 1=100%).

Figure 5:
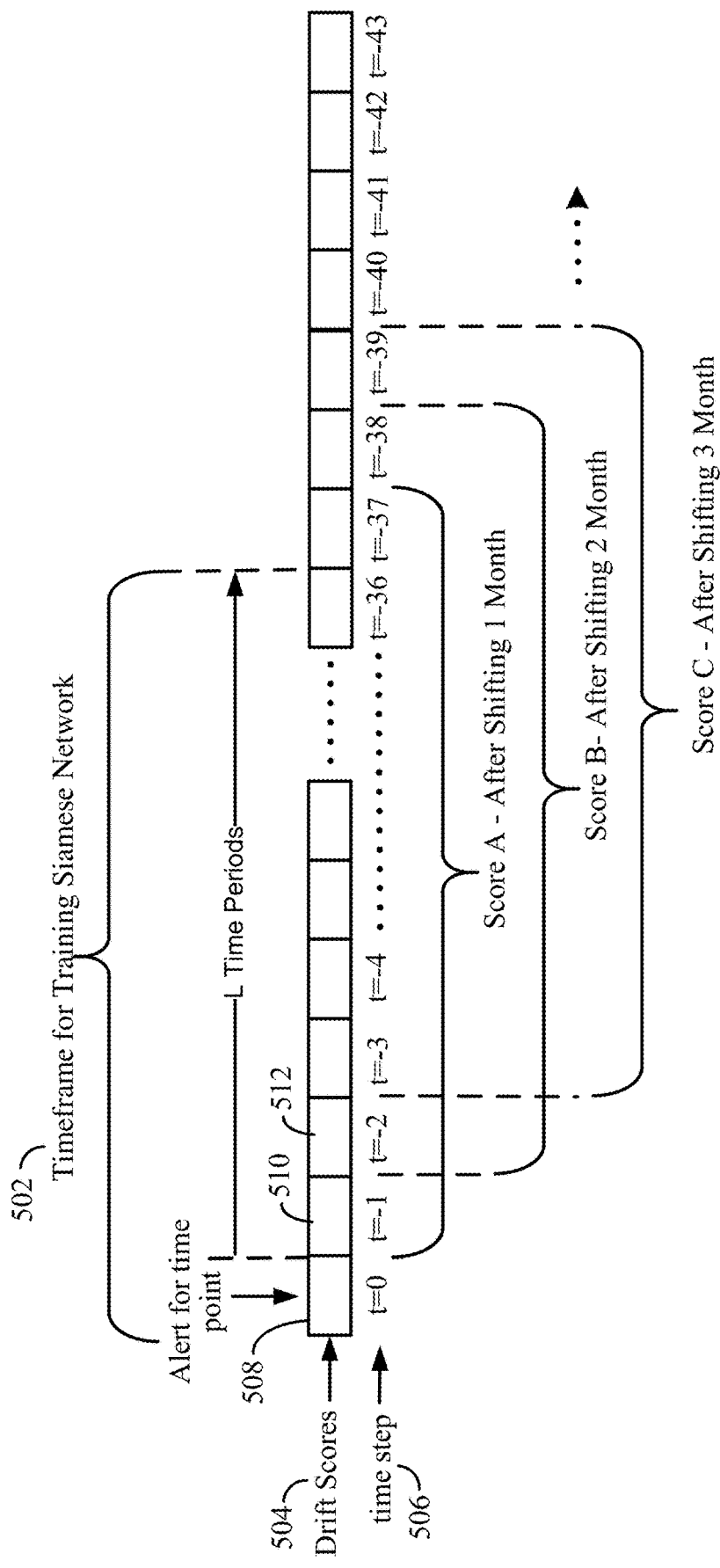
FIG. 5 is a diagram illustrating how drift may be calculated from the output of a neural network.

FIG. 5 is a diagram illustrating how drift may be calculated from the output of a neural network. In this example, a Siamese neural network may be trained over a period of time 502 where multiple drift scores 504 may be obtained at multiple time steps or periods 506. Each time period or step 506 may be defined in hours, days, weeks, months, or other intervals. However, the number L of previous time steps used (e.g., 36) is merely illustrative and it is contemplated that different numbers of previous time steps may be used in various implementations. In this example, a first drift score 508, for a current time step (t=0), may be calculated based on the Siamese neural network data and/or states from 36 previous time steps. Similarly, a second drift score 510, for a previous time step (t=−1), may be calculated based on the Siamese neural network data and/or states from the 36 previous time steps. Likewise, a third drift score 512, for a second previous time step (t=−2), may be calculated based on the Siamese neural network data and/or states from L previous time steps (e.g., 36 months). This process may continue to obtain drift scores based on the previous L time steps. From these drift scores obtained over time, it may be observed whether the drift scores for a particular party (e.g., customer, bank, institution) change more than a threshold relative to market drift scores (e.g., plurality of institutions, plurality of customers, etc.).

Figure 6:
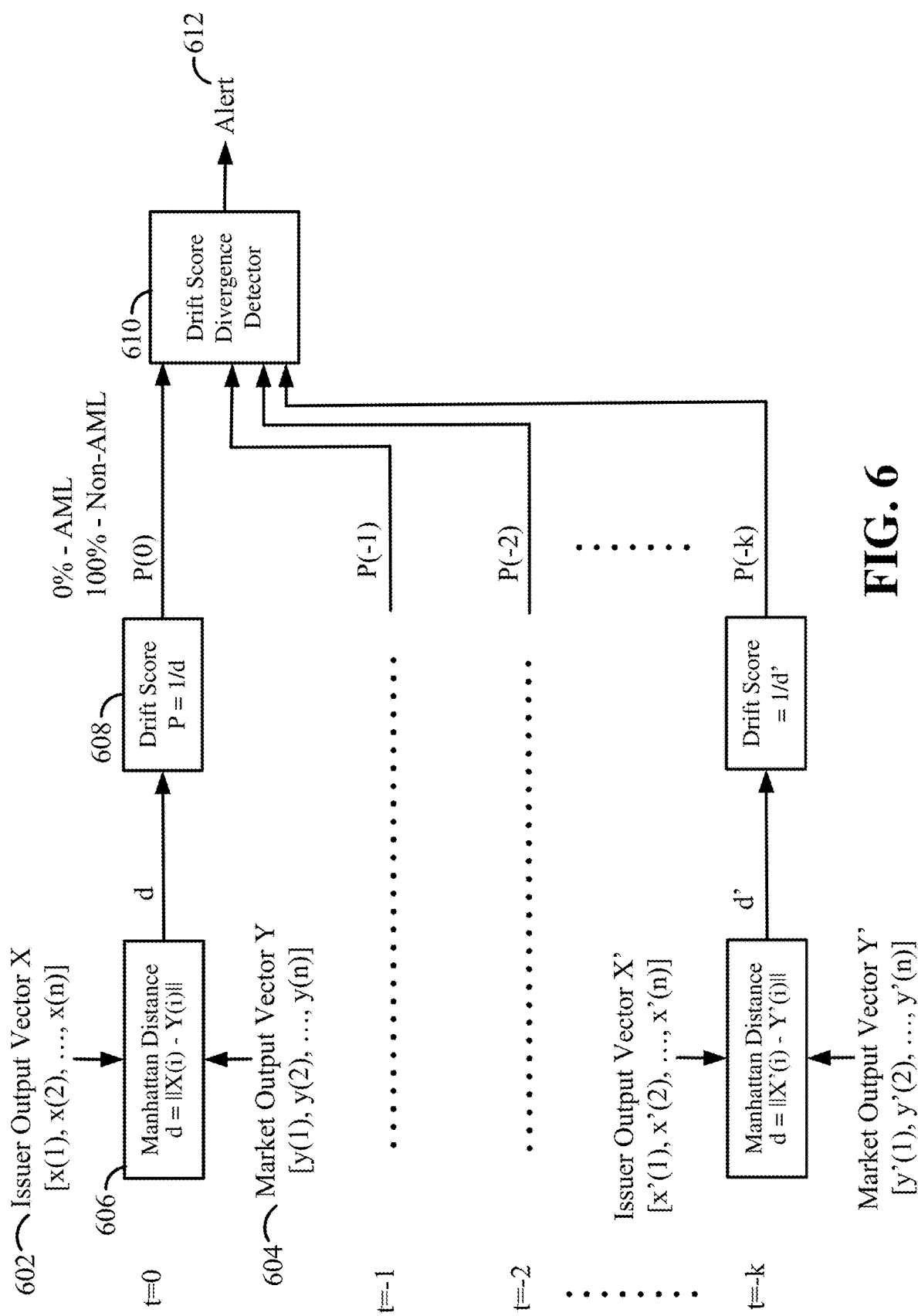
FIG. 6 is a block diagram illustrating one implementation of how drift scores and alerts may be obtained for financial transactions.

FIG. 6 is a block diagram illustrating one implementation of how drift scores and alerts may be obtained for financial transactions. In this example, the output vectors X 602 and Y 604 from a Siamese neural network (such as the Siamese neural networks in FIGS. 2 and/or 3) may serve to obtain drift scores and ascertain whether an alert should be issued.

For a time t=0, i.e., a current time period, an output vector X 602 may be obtained which is associated with a plurality of financial transactions for a party of interest (e.g., issuer, target, etc.). As illustrated in FIG. 5, the financial transactions for the vector X 602 may span a current time period (t=0) as well as a plurality of preceding time periods (e.g., the preceding L number of months). Likewise, for the same time t=0, an output vector Y 604 may be obtained which is associated with a plurality of financial transactions, encompassing the current time period (t=0) and the same plurality of L preceding time periods, for similarly positioned parties (e.g., market, same region, same business sector, etc.). The output vectors X 602 and Y 604 may each include, for example, n points (e.g., where n=100, 500, 1000, etc.), which are the outputs from the Siamese neural networks.

To ascertain a difference or distance between the output vectors X 602 and Y 604, a distance may be taken between each corresponding points or values of the vectors. In one example, a Manhattan distance 606 may be calculated between vector points and used to obtain on overall distance between the vectors X and Y. A Manhattan distance d may be defined as the sum of the horizontal and vertical distances between points on a grid. For instance, the Manhattan distance between two points $X=(x_1, x_2, \ldots, x_n)$ and $Y=(y_1, y_2, \ldots, y_n)$ in n-dimensional space may be the sum of the distances obtained in each dimension:

$$d(x, y) = \sum_{i=1}^{n} |x_i - y_i|$$

The output vectors X and Y from the Siamese neural networks may be, for example, two 100-dimensional vectors which are used to calculate the Manhattan distance d. The Manhattan distance may be in the range of 0 to infinity, but may be constrained to a range of 1 to infinity, etc. It is contemplated that other types of vector distances may be used to obtain a distance between vectors X and Y.

A drift score 608 may be obtained from the Manhattan distance d. For instance, the drift score 608 may be obtained by normalizing the obtained vector distance d to a value in the range of 0 and 1. In one example, such drift score P (at time t=0) may be obtained by dividing 1 by the vector distance d (i.e., 1/d). The drift score P may be represented, for example, as a decimal value between 0 and 1 or as a percentage between 0% and 100%. For example, a drift score close to 1 or 100% may indicate non-AML activity (e.g., legitimate financial transactions) and a drift score close to 0 may indicate AML activity (e.g., suspicious financial transactions). It is contemplated that other methods and/or operations may be used to convert the vector distance to a drift score.

Additionally, rather than relying on a single drift score (e.g., at t=0), a plurality of drift scores associated with previous time periods (e.g., t=-1, t=-2, t=-k) may be used ascertain whether an alert 612 should be issued. That is, a single drift score Pi may not trigger an alert. Rather, a plurality of drift scores $P(0), P(-1), P(-2), \ldots P(-k)$, over multiple previous time periods (e.g., t=-1, t=-2, t=-k), may be used to ascertain drift for a party of interest over an expanded time frame. As illustrated in FIG. 5, each drift score $P(0), P(-1), P(-2) \ldots P(-k)$ may be calculated to encompass different time periods. For example, a first drift score P(0) may correspond to a current time period t=0 and the preceding L time periods. A second drift score P(-1) may correspond to a first preceding time period t=-1 and the preceding L time periods. A third drift score P(-2) may correspond to a second preceding time period t=-2 and the preceding L time periods. This process may continue until a plurality of drift scores (e.g., k+1) are obtained. In some implementations, the drift scores may be stored from previous time period calculations so that they may be reused in subsequent alert evaluations.

A drift score divergence detector 610 uses the k+1 drift scores $P(0), P(-1), P(-2), \ldots P(-k)$ to ascertain Whether an alert 612 should be issued. That is, a decision to issue an AML alert 612 may be based on a pattern of the drift scores trending toward 0 (or indicative of AML activity). Thus, Whenever any significant change is noticed, based on the extent to which the drift scores indicate divergence from the baseline or market transactions (e.g., drift scores shifting toward 0 or AML activity), an alert 612 is issued. The threshold at which such divergence of drift scores may be trigger an alert may be empirically defined. In one example, three or more sequential drift scores below 50% (or 0.5) may trigger an alert. In another example, two or more sequential drift scores below 30% (or 0.3) may trigger an alert. In yet another example, if 3 or more drift scores out of the previous M drift scores (e.g., 6 or 7 drift scores) is below a threshold (e.g., 60%, 50%, 40%, etc.), then the alert is triggered. In yet other implementations, a plurality of different conditions (e.g., three or more sequential drift scores below 50%, two or more drift scores below 35%, or a single drift score below 10%) may trigger an alert.

Figure 7:
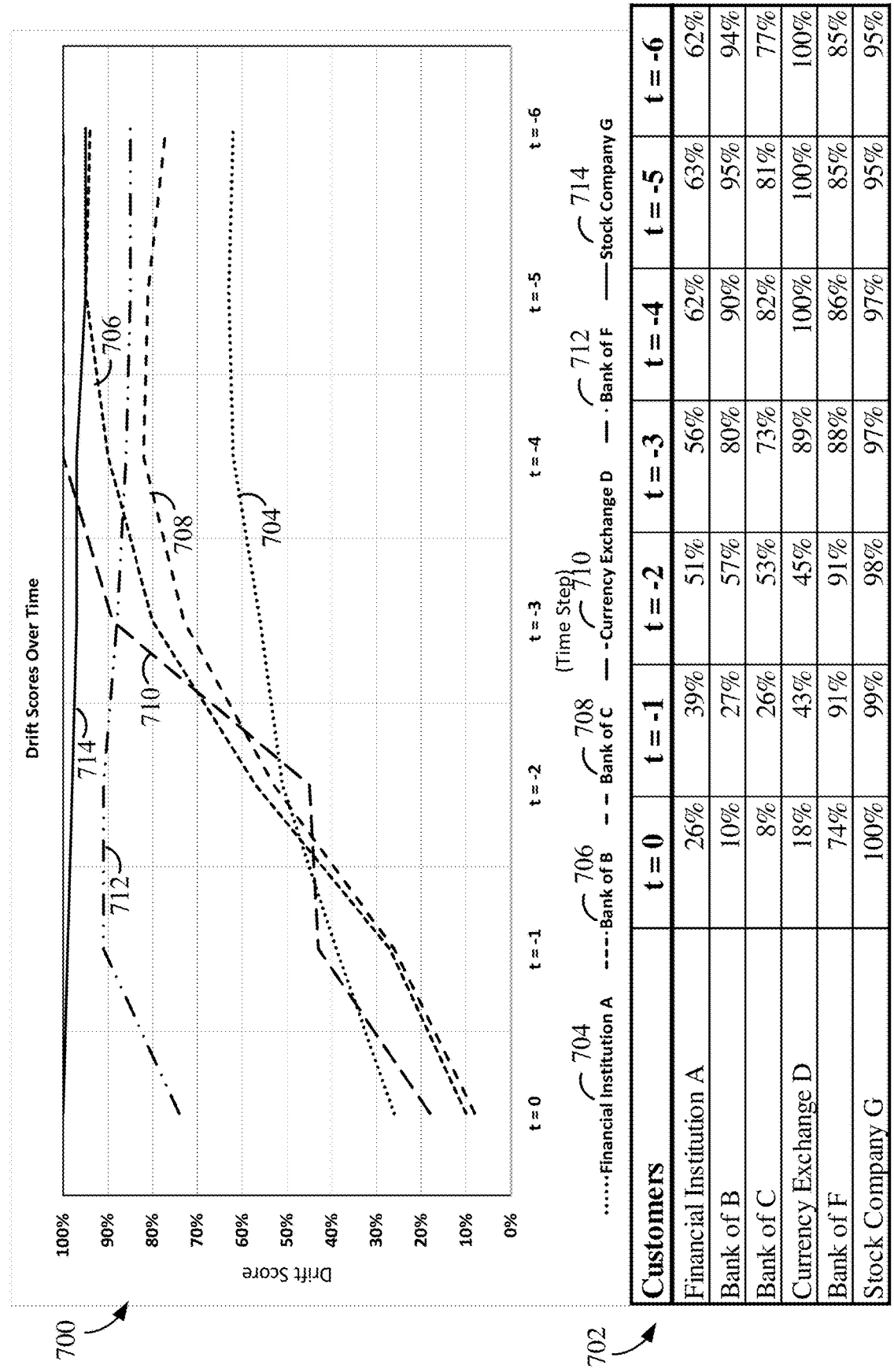
FIG. 7 is a diagram illustrating examples of how drift scores may be utilized to detect potential money laundering activity.

FIG. 7 is a diagram illustrating examples of how drift scores may be utilized to detect potential money laundering activity. In this example, a table 702 illustrates drift scores for a plurality of customers (e.g., parties or financial institutions) over seven time steps or periods. The table 702 illustrates the drift scores over time from right (oldest) to left (most recent). In one example, the drift scores illustrated in FIG. 7 may be calculated using one or more of the steps illustrated and described with reference to FIGS. 2, 3, 4, 5, and/or 6. The drift scores are represented as percentages between 0% (greatest deviation from the market) to 100% (no deviation from the market). A graph 700 of the drift scores in the table 702 visually shows some customers (e.g., Bank of F 712 and Stock Company G 714) whose drift scores over time closely track the market by remaining close to 100% (e.g., no money laundering activity is likely). This same graph 700 shows other customers (e.g., Financial Institution A 704, Bank of B 706, Bank of C 708, and Currency Exchange D 710) whose drift scores over time diverge from the market, sliding towards 0% (e.g., potential money laundering activity detected).

The threshold at which a drift score is considered to trigger an alarm (e.g., potential fraud or money laundering activity) may be selected based on empirical testing. However, the closer the drift score is to 0, the higher the likelihood that there is money laundering or fraudulent financial activity by a targeted party. Inversely, the closer a drift score is to 1, the lower the likelihood that there is no money laundering or fraudulent financial activity by the targeted party.

Note that the totality of "market" financial transactions, which act as a baseline against which the transactions for a target party or customer are compared, may be selected to match one or more criteria. For instance, the parties or customers whose transactions make up the "market" financial transactions may be selected to be in the same geographical region (e.g., city, state, country, continent, etc.) as the target party or customer, in the same market sector or industry as the target party or customer (e.g., restaurants, technology, financial services, etc.), or in the same demographic group (e.g., based on age, education, level, income level, etc.).

This approach of using a drift score that compares financial transactions for a target party relative to "market" financial transactions for multiple parties has several advantages over other approaches used to detect fraud or potential money laundering activities. For example, in regions affected by a localized event (e.g., earthquakes, pandemics, emergencies, holidays, etc.), this approach allows a comparison of a party's financial activities against a baseline of financial transactions for similarly situated parties in the same region. Therefore, any changes in the financial transactions for the target party may not trigger an AML alarm since the drift scores are obtained relative to financial transactions for similarly situated parties who would also be affected by such localized events. In that case, because the financial transactions for the similarly situated parties (from which the baseline is constructed) would also be affected by the localized event, the drift score for a target party would not change significantly relative to the baseline unless there is money laundering activity by the target party.

In another example, drift scores may also serve to account for events that impact a particular industry (e.g., oil industry, restaurants, automotive, finance, etc.) by selecting transactions for similarly situated customers as the target customer. That is, when a target customer is part of a particular industry, then the financial transactions that make up the "market" input vector would come from other customers in the same industry.

In addition to filtering by region and/or industry, transactions may also be filtered by transaction type, such as credit card transactions, checks, deposits, withdrawal, foreign or cross-border transactions, domestic transactions, etc., such that only such transactions for both the target customer and the "market"/baseline are used in obtaining the drift score.

In various implementations, a target party's financial activities may be evaluated against multiple different selections of market/baseline transactions to attempt to detect potential fraudulent or money laundering activities. For instance, a target party may be compared relative to a first group of selected customers (e.g., first baseline) within the same industry, and then also compared relative to a second group of selected customers (second baseline) within the same region. By executing multiple comparisons with different baselines of similarly situated customers, the chances of detecting potentially fraudulent or money laundering activities may be improved.

Figure 8:
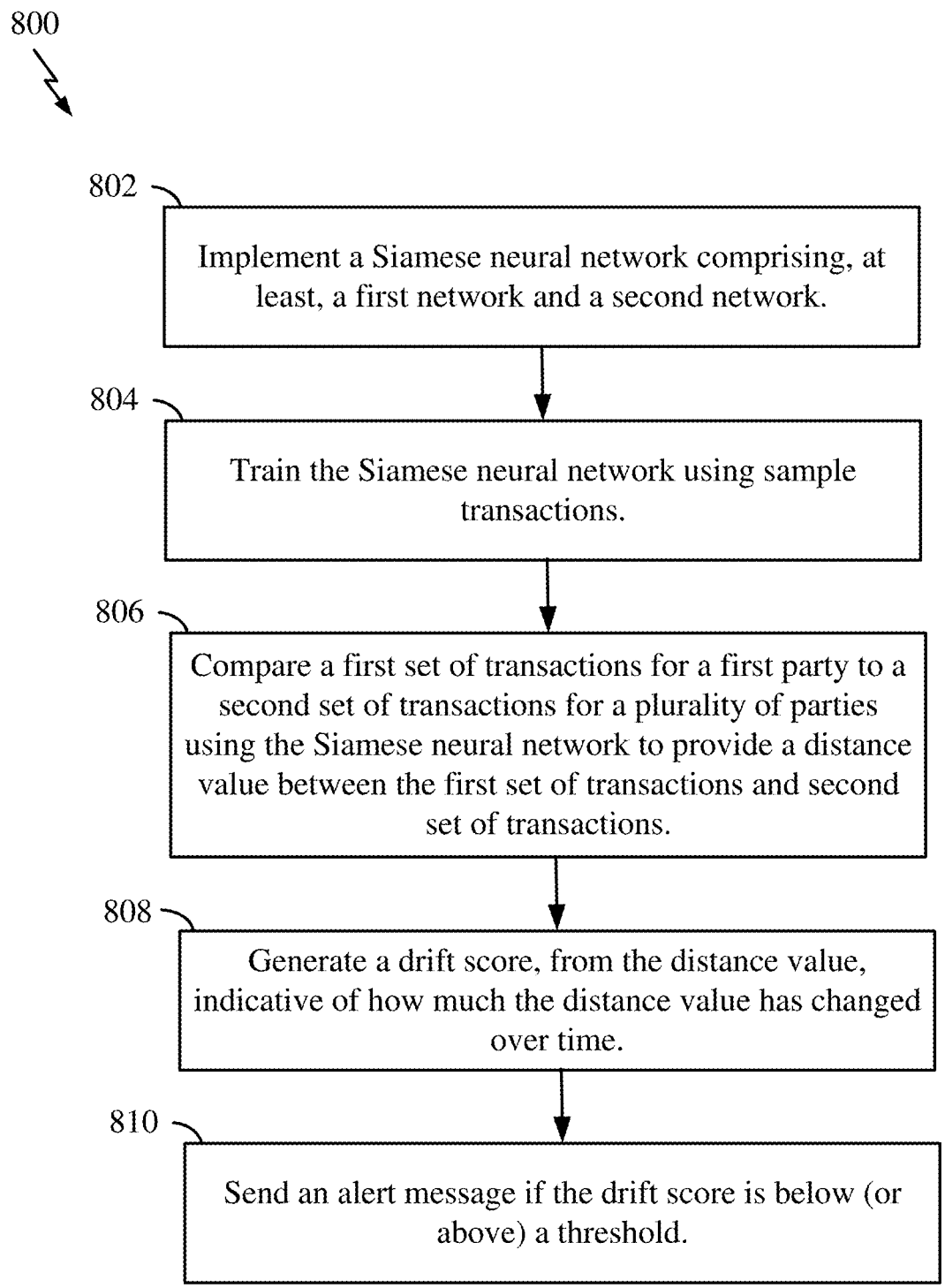
FIG. 8 is a method for detecting anomalous transactions using a Siamese neural network.

FIG. 8 is a method 800 for detecting anomalous transactions using a Siamese neural network. The Siamese neural network may comprise, at least, a first network and a second network 802. For example the Siamese neural network may be implemented as illustrated in FIGS. 2, 3 and 4. In one implementation, the Siamese neural network may be bidirectional long short term memory (LSTM) recurrent neural network. The first network and the second network may have identical structures, weights, and parameters, but use different input vectors. In one example, the transactions may be financial transactions including withdrawals, deposits, transfers, currency exchanges, purchases, credits, wires, etc. However, any other type of transaction is contemplated and within the scope of this method.

The Siamese neural network may be trained (e.g., configured) using sample transactions 804. For instance, the sample transactions may include a plurality of non-anti-money-laundering (non-AML) financial transactions as well as one or more AML financial transactions (e.g., likely fraudulent or money laundering). In one example, the first network and second network are trained to generate a drift score of "1" for non-AML financial transactions and a drift score of 0 for AML financial transactions. Note that, when a mix of AML and non-AML financial transactions are used, the first network and second network may generate a drift score of between 0 and 1.

After the Siamese neural network has been trained, a first set of transactions for a first party (e.g., customer, bank, business, target party, etc.) may be compared to a second set of transactions (e.g., a baseline of financial transactions) for a plurality of parties (e.g., all or a selected subset of customers, banks, businesses) by using the Siamese neural network to provide a distance value between the first set of transactions and second set of transactions 806. For example, the first set of transactions for the first party may serve as an input vector to the first network while the second set of transactions for the plurality of parties may serve as an input vector to the second network. Each of the first and second networks may provide an output vector corresponding to the evaluation of the transactions in their corresponding input vector. For example, each of the output vectors for the first network and second network may be vectors with n-points (e.g., where n is 100, 500, 1000, etc.).

A distance value (e.g., Manhattan distance) may then be generated between the two output vectors from the first and second networks. One example of such distance value is illustrated in FIG. 6.

A drift score may then be generated, from the distance value, where the drift score is indicative of how much the distance value has changed over time 808. For instance, the drift score may be based on financial transactions covering a current time period (e.g., time steps) as well as at least some previous time periods. This concept is illustrated in FIGS. 5, 6, and 7.

If the drift score is below (or above) a desired threshold, then an alert message is provided 810. For instance, the alert message may be sent, displayed, or transmitted to a financial regulatory agency or a financial institution from where the first party performs the transactions. For instance, if the drift score falls below 0.5 (or 50%), then the alert message may be provided.

According to one aspect, a history of sequential drift scores may be used to ascertain whether an alert message is provided. That is, drift scores for a plurality of immediately past/previous time periods may be used in evaluating whether the alert message 810 is sent. A pattern of drift scores indicative of market deviation over time (e.g., target financial transactions deviating relative to baseline market transactions) may be indicative of AML activity. For example, in addition to a drift score associated with a current time period, a plurality of drift scores (e.g., 5, 6, 7, 8 . . . ) drift scores associated with immediately preceding time periods may be used to ascertain whether there is sufficient drift to trigger an alarm/alert message. Examples of this are illustrated and described in FIGS. 5, 6, and 7.

Figure 9:
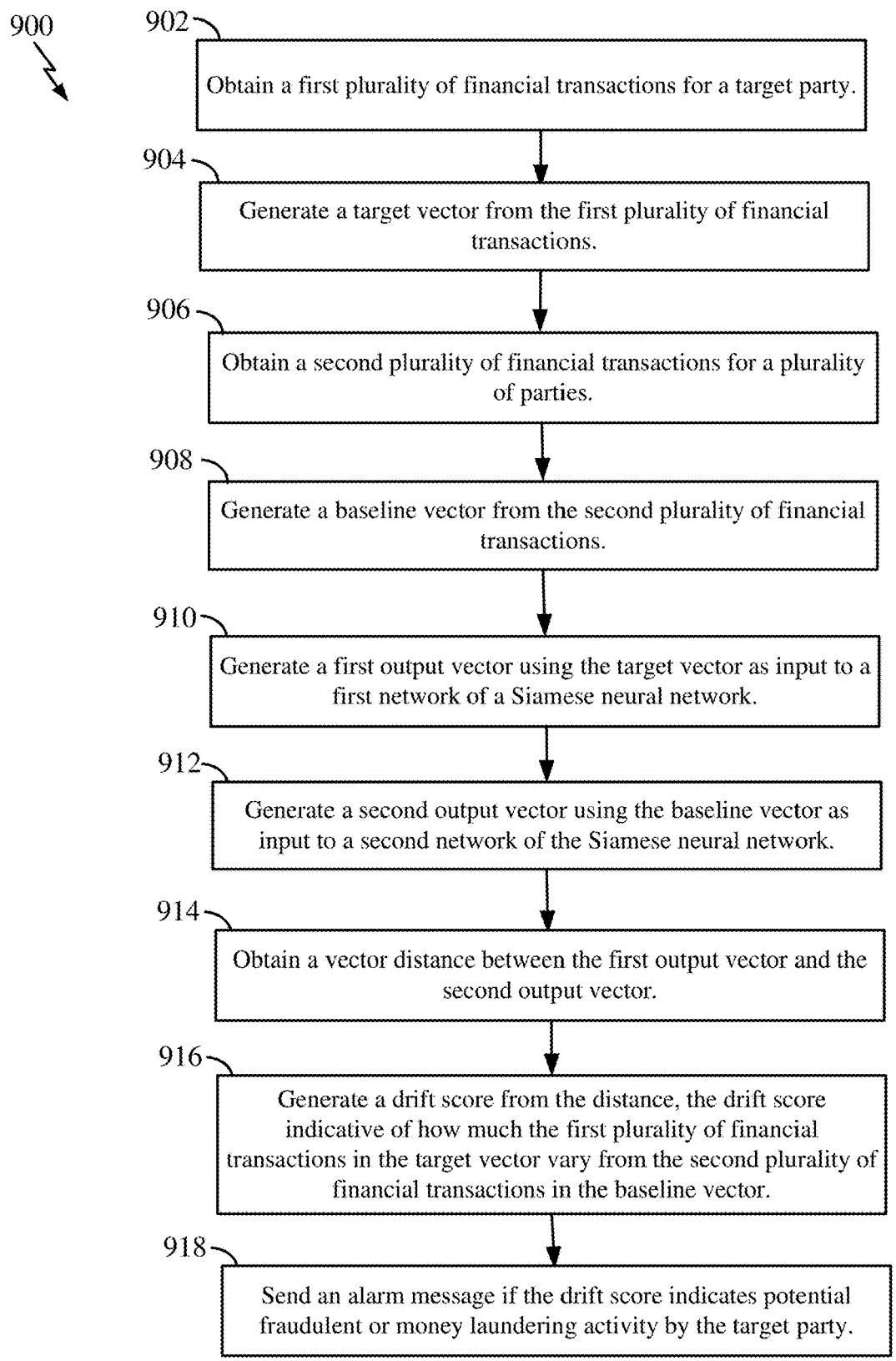
FIG. 9 is a method for detecting potentially fraudulent or money laundering transactions using a Siamese neural network.

FIG. 9 is a method 900 for detecting potentially fraudulent or money laundering transactions using a Siamese neural network. Like the example in FIG. 8, the Siamese neural network may be implemented by at least two bidirectional long short term memory (LSTM) recurrent neural networks (RNN) that may have identical structures, weights, and parameters. These bidirectional LSTM recurrent neural networks may be trained to discern between non-AML transactions and AML transactions and provide a corresponding output. The Siamese neural network may be trained based on a plurality of sample transactions to detect differences between legitimate financial transactions and potentially money laundering financial transactions.

A first plurality of financial transactions for a target party may be obtained, received, and/or requested 902. The target party may be a customer, entity, or institution whose financial transactions are to be evaluated for potential fraudulent or money laundering activity. In one example, the first plurality of financial transactions may include both dates, amounts, and/or types of transactions (e.g., [Payments: Jan. 1, 2020, $345.21, Jan. 3, 2020, $23.45, Jan. 7, 2020, $56.10, Jan. 16, 2020, $2.43, . . . Deposits: Jan. 4, 2020, $367.00, Jan. 15, 2020, $755.24, Jan. 29, 2020, $896.20, Feb. 5, 2020, $543.75 . . . Credits: Jan. 9, 2020, $15.50, Jan. 22, 2020, $35.10, Feb. 5, 2020, $27.98, Feb. 19, 2020, $89.75, . . . ]). These transactions may be obtained, retrieved, or requested all once or collected over time.

A target vector may be generated from the first plurality of financial transactions 904. For instance, if only deposits during the month of January 2020 are being evaluated in a particular time step, then the target vector may include only amounts for deposit transactions during that month (e.g., [367.00, 755.24, 896.20, 543.75]).

A second plurality of financial transactions for a plurality of parties may also be obtained, received, and/or requested 906. In some instances, the plurality of parties may be all customers, institutions, entities, etc., for which financial transactions are available. In other instances, the plurality of parties may be selected or limited to similarly situated parties as the target party. In some examples, the plurality of parties and the target party may be in at least one of: the same geographical region, the same business sector or industry, or the same demographic group. Additionally, the first plurality of financial transactions and the second plurality of financial transactions may be selected to be within the same time period (e.g., transactions in the same week, month, year, etc.) and/or selected to be of a same transaction type.

This second plurality of financial transactions may serve to generate a baseline vector 908. Such baseline vector may serve as a measure against which the target vector is measured or compared.

According to one aspect, the first plurality of financial transactions in the target vector may include financial transactions for a current time period as well as financial transactions for a plurality of L previous time periods (where L is an integer number), and the second plurality of financial transactions in the baseline vector may include financial transactions for the current time period as well as financial transactions for the same plurality of L previous time periods.

A first output vector is generated using the target vector as input to a first network of the Siamese neural network 910. Similarly, a second output vector is also generated using the baseline vector as input to a second network of the Siamese neural network 912. Each of the first and second output vector may have the same number of points and may be generated based on transactions that occurred during a current time period as well as transactions that occurred over one or more previous time periods.

Is some implementations, each of the first network and the second network may have a retained memory of n previous time steps which serve to generate the first output vector and the second output vector.

A vector distance between the first output vector and the second output vector is then obtained 914. For example, a Manhattan distance may be obtained between the two vectors, where for an n-dimensional space, the obtained distance may be the sum of the distances obtained in each dimension.

A drift score may then be generated from the vector distance, where the drift score is indicative of how much the first plurality of financial transactions in the target vector vary from the second plurality of financial transactions in the baseline vector 916. As illustrated in FIG. 6, the drift score normalizes the vector distance (e.g., between to a range between 0 and 1). According to one aspect, the vector distance may be normalized within a defined range (e.g., between 0 and 1) to obtain the drift score. In this manner, the drift score may be constrained within a learned discriminative space defining money laundering transactions and non-money laundering transactions.

According to one example, the drift score generated from the vector distance may be based on the first plurality of financial transactions includes financial transactions for a current time period as well as financial transactions for a plurality of L previous time periods (where L is an integer number), and the plurality of immediately preceding drift scores for the same target party include a previous drift score comprising financial transactions for a previous time period as well as financial transactions for L prior time periods. Examples of this financial transactions extending over L time periods are illustrated in FIG. 5.

An alarm message may be sent (e.g., transmitted, displayed, or provided) if the drift score indicates potential fraudulent or money laundering activity by the target party 918. This alarm message may be transmitted to regulatory agencies, financial institutions, and/or transaction processors to provide warning that financial transactions by the target party may be involved in fraudulent or money laundering activities. In some implementations, the alarm message is sent only if a pattern of a plurality of immediately preceding drift scores indicates AML activities or are below a threshold.

In some implementations, the alarm message may be provided (e.g., sent or transmitted) only if the drift score and a plurality of immediately preceding drift scores for the same target party, in combination, indicate potential fraudulent or money laundering activity by the target party. For example, the alarm message may be provided if two or more of the drift scores fall within a range associated with potential fraudulent or money laundering activity.

Figure 10:
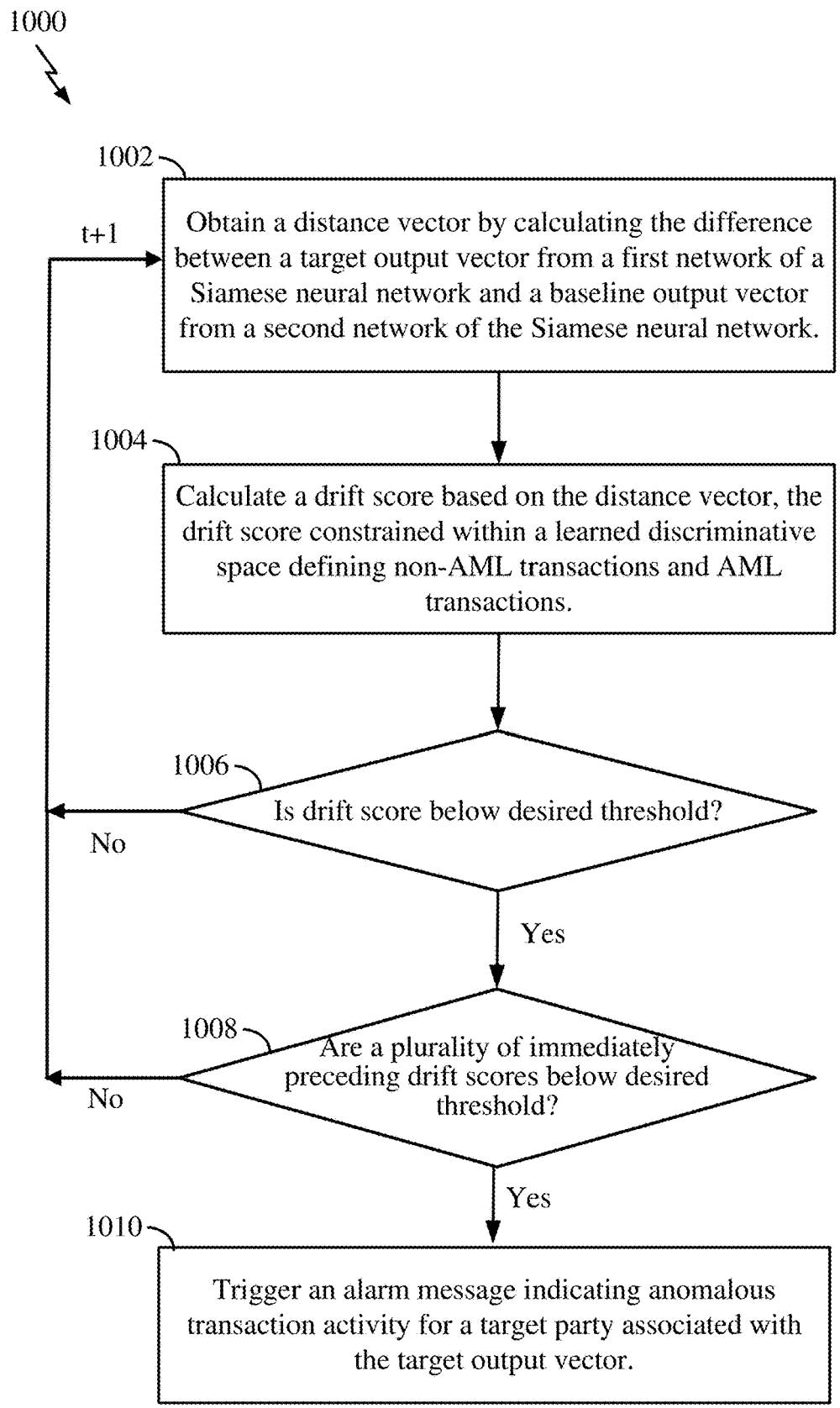
FIG. 10 illustrates a method for obtaining a drift score that may serve to detect anomalous transactions relative to baseline transactions over time.

FIG. 10 illustrates a method 1000 for obtaining a drift score that may serve to detect anomalous transactions relative to baseline transactions over time. A distance vector is obtained 1002 by calculating the difference between a target output vector from a first network of a Siamese neural network and a baseline output vector from a second network of the Siamese neural network. A drift score is then calculated 1004 based on the distance vector, the drift score constrained within a learned discriminative space defining non-AML transactions and AML transactions. For instance, the discriminative space may be between 0 (or 0%), representing AML activity, and 1 (or 100%), representing non-AML activity. In this instance, a drift score moving toward 0 would indicate AML activity may have been detected. In alternative implementations, the discriminative space may be reversed with 0 (or 0%), representing non-AML activity, and 1 (or 100%), representing AML activity. If the drift score is below a threshold 1006 (e.g., a threshold below which AML activity is indicated), then an alarm message may be triggered (e.g., sent, displayed, etc.) indicating anomalous transaction activity for a target party associated with the target output vector 1010. Otherwise, the method repeats the process in the next time step.

In some implementations, the alarm/alert message is only triggered 1010 if a plurality of immediately preceding drift scores are below the desired threshold 1008. That is, if a pattern of immediately preceding drift scores (e.g., 2 out of immediately previous 5 drift scores, or 3 out of 7 immediately previous drift scores, etc.) shows a trend of AML transaction activity (e.g., drift scores toward a threshold indicative of AML activity).

Figure 11:
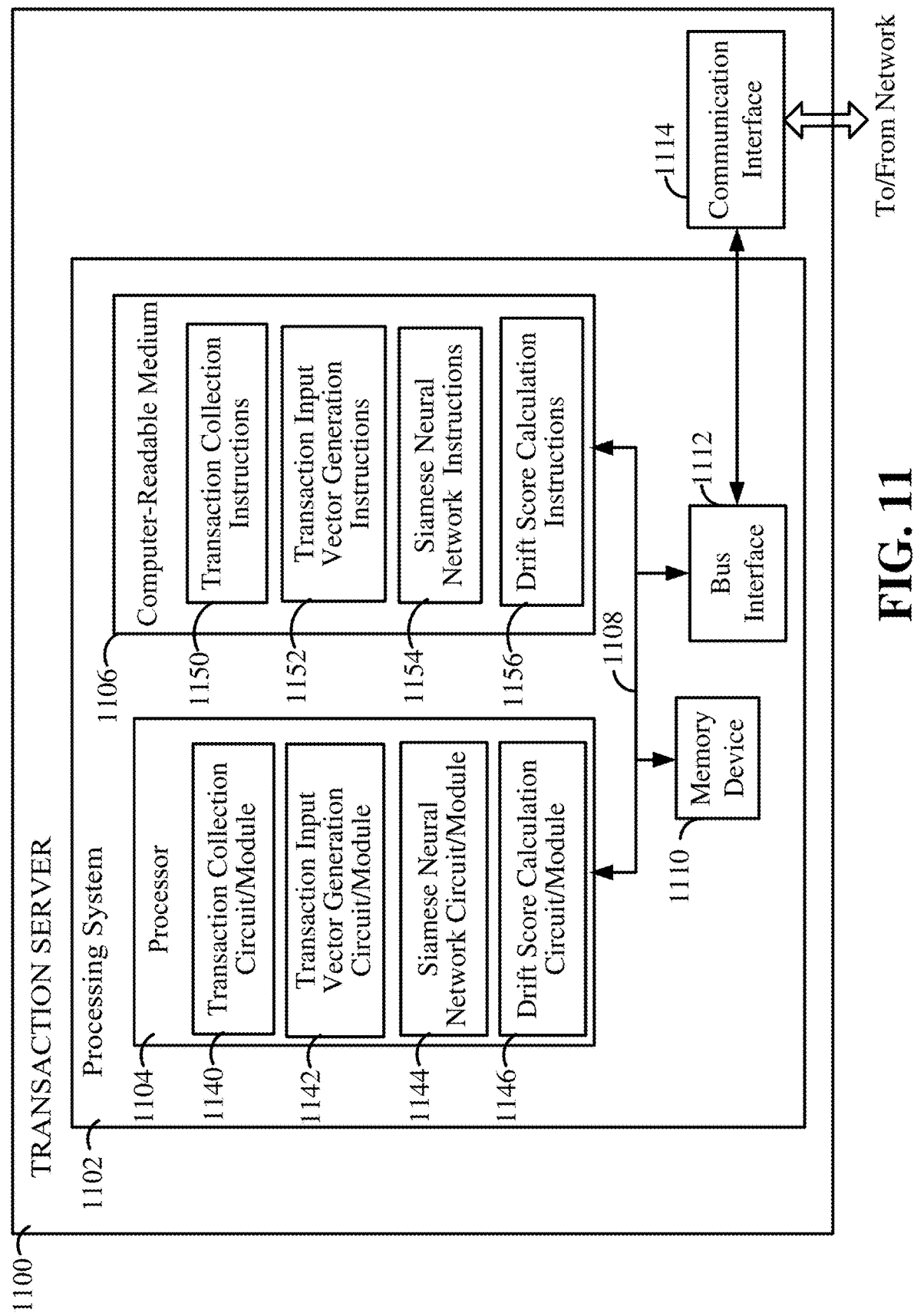
FIG. 11 is a block diagram illustrating an exemplary transaction server that may be configured to detect potential fraudulent or money laundering activity using a Siamese neural network.

FIG. 11 is a block diagram illustrating an exemplary transaction server 1100 that may be configured to detect potential fraudulent or money laundering activity using a Siamese neural network. The transaction server 1100 may be configured to implement one or more of the steps or functions illustrated in FIGS. 1-10.

The transaction server 1100 may include a processing system 1102 that may be implemented with a bus architecture, represented generally by the bus 1108. The bus 1108 may include any number of interconnecting buses and bridges depending on the specific application of the processing system 1102 and the overall design constraints. The bus 1108 communicatively couples together various circuits including one or more processors (represented generally by the processor 1104), a computer-readable (or processor-readable) storage media (represented generally by the computer-readable storage medium 1106), and a memory device 1110. The bus 1108 may also link various other circuits such as timing sources, peripherals, voltage regulators, and power management circuits, which are well known in the art, and therefore, will not be described any further. A bus interface 1112 provides an interface between the bus 1108 and a communication interface 1114. The communication interface 1114 provides a means for communicating with various other apparatus over a transmission medium, such as a network. In this manner, the transaction server 1100 may communicate with one or more networks, other servers (e.g., for financial institutions, etc.) and/or devices.

The processor 1104 in the processing system 1102 may be configured to execute software. Such software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable storage medium 1106. The processor-readable storage medium 1106 may be a non-transitory processor-readable storage medium.

In some aspects of the disclosure, the processor 1104 may include a transaction collection circuit or module 1140 configured for various functions, including, for example, collecting (e.g., requesting, receiving, and/or retrieving) financial transactions from one or more financial institutions. For example, the transaction collection circuit or module 1140 may be configured to implement one or more of the functions described in relation to obtaining transactions in FIG. 9, including, e.g., blocks 902 and 906.

In some aspects of the disclosure, the processor 1104 may also include a transaction input vector generation circuit or module 1142 configured for various functions, including, for example, generating a target vector and/or a baseline vector from the collected transactions. For example, the transaction input vector generation circuit or module 1142 may be configured to implement one or more of the functions described in relation with generating a target vector or baseline vector in FIG. 9, including, e.g., blocks 904 and 908.

In some aspects of the disclosure, the processor 1104 may also include a Siamese (or twin) neural network circuit or module 1144 configured for various functions, including, for example, implementing a bidirectional long short term memory (LSTM) recurrent neural networks (RNN). For example, the Siamese (or twin) neural network circuit or module 1144 may be configured to implement one or more of the functions described in relation with evaluating the target vector and baseline vector to generate corresponding output vectors in FIG. 8, including e.g., blocks 802, 804, and 806, and FIG. 9, including, e.g., blocks 910, 912, and 914.

In some aspects of the disclosure, the processor 1104 may also include a drift score calculation circuit or module 1146 configured for various functions, including, for example, calculating a drift score indicative of how much the financial transactions in the target vector vary from the financial transactions in the baseline vector. For example, the drift score calculation circuit or module 1146 may be configured to implement one or more of the functions described in relation with evaluating the target vector and baseline vector to generate corresponding output vectors in FIG. 8, including e.g., block 808, and FIG. 9, including, e.g., block 916.

The computer-readable medium 1106 may include instructions for processing and/or evaluating transactions. By way of example, the non-transitory computer-readable storage medium may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. In various implementations, the computer-readable storage medium 1106 may reside in the processing system 1102, external to the processing system 1102, or distributed across multiple entities including the processing system 1102. The computer-readable storage medium 1106 may be embodied in a computer program product. By way of example, a computer program product may include a computer-readable (or processor-readable) storage medium in packaging materials.

In some aspects of the disclosure, the processor-readable storage medium 1106 may include transaction collection software/instructions 1150 configured for various functions, including, for example, collecting (e.g., requesting, receiving, and/or retrieving) financial transactions from one or more financial institutions. For example, the transaction collection software/instructions 1150 may be configured to implement one or more of the functions described in relation to obtaining transactions in FIG. 9, including, e.g., blocks 902 and 906.

In some aspects of the disclosure, the processor-readable storage medium 1106 may further include transaction input vector generation software/instructions 1152 configured for various functions, including, for example, generating a target vector and/or a baseline vector from the collected transactions. For example, the transaction input vector generation software/instructions 1152 may be configured to implement one or more of the functions described in relation with generating a target vector or baseline vector in FIG. 9, including, e.g., blocks 904 and 908.

In some aspects of the disclosure, the processor-readable storage medium 1106 may also include Siamese (or twin) neural network software/instructions 1154 configured for various functions, including, for example, implementing a bidirectional long short term memory (LSTM) recurrent neural networks (RNN). For example, the Siamese (or twin) neural network software/instructions 1154 may be configured to implement one or more of the functions described in relation with evaluating the target vector and baseline vector to generate corresponding output vectors in FIG. 8, including e.g., blocks 802, 804, and 806, and FIG. 9, including, e.g., blocks 910, 912, and 914.

In some aspects of the disclosure, the processor-readable storage medium 1106 may also include drift score calculation software/instructions 1156 configured for various functions, including, for example, calculating a drift score indicative of how much the financial transactions in the target vector vary from the financial transactions in the baseline vector. For example, the drift score calculation software/instructions 1156 may be configured to implement one or more of the functions described in relation with evaluating the target vector and baseline vector to generate corresponding output vectors in FIG. 8, including e.g., block 808, and FIG. 9, including, e.g., block 916.

Within the present disclosure, the words "exemplary" or "example" are used to mean "serving as an instance or illustration." Any implementation or aspect described herein as "exemplary" or "an example" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another, even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method for detecting anomalous financial activity, comprising:
    obtaining a target vector from a first plurality of financial transactions for a target party;
    obtaining a time-dependent baseline vector from a second plurality of financial transactions for a plurality of parties, wherein the first plurality of financial transactions in the target vector include financial transactions for a current time period as well as financial transactions for a plurality of L previous time periods, and the second plurality of financial transactions in the baseline vector include financial transactions for the current time period as well as financial transactions for the same plurality of L previous time periods;
    training a Siamese neural network based on a plurality of sample transactions to detect differences between legitimate financial transactions and potentially money laundering financial transactions;
    generating a first output vector using the target vector as input to a first network of the Siamese neural network;
    generating a second output vector using the baseline vector as input to a second network of the Siamese neural network;
    obtaining a vector distance between the first output vector and the second output vector; and
    generating a drift score from the vector distance, the drift score indicative of how much the first plurality of financial transactions in the target vector vary from the second plurality of financial transactions in the baseline vector; and
    providing an alarm message if the drift score indicates potential fraudulent or money laundering activity by the target party.

2. The method of claim 1, wherein each for the first network and the second network is a bidirectional long short term memory (LSTM) recurrent neural network.

3. The method of claim 1, wherein each of the first network and the second network are identical networks that are configured to use the same weights and parameters within and between layers of the first network and the second network.

4. The method of claim 1, wherein each of the first network and the second network have a retained memory of n previous time steps which serve to generate the first output vector and the second output vector.

5. The method of claim 1, further comprising:
    selecting the plurality of parties to be similarly situated as the target party.

6. The method of claim 5, wherein the plurality of parties and the target party are in at least one of: the same geographical region, the same business sector or industry, or the same demographic group.

7. The method of claim 1, wherein the first plurality of financial transactions and the second plurality of financial transactions are selected to be within the same time period.

8. The method of claim 1, wherein the first plurality of financial transactions and the second plurality of financial transactions are selected to be of a same transaction type.

9. The method of claim 1, wherein the alarm message is provided only if the drift score and a plurality of immediately preceding drift scores for the same target party, in combination, indicate potential fraudulent or money laundering activity by the target party.

10. The method of claim 9, wherein the alarm message is provided if two or more of the drift scores fall within a range associated with potential fraudulent or money laundering activity.

11. The method of claim 9, wherein the drift score generated from the vector distance is based on the first plurality of financial transactions includes financial transactions for the current time period as well as financial transactions for the plurality of L previous time periods, and the plurality of immediately preceding drift scores for the same target party include the previous drift score comprising financial transactions for the previous time period as well as the financial transactions for L prior time periods.

12. The method of claim 1, wherein the vector distance is normalized within a defined range to obtain the drift score.

13. A non-transitory computer-readable storage medium having instructions thereon, wherein the instructions, when executed by a processing circuit, cause the processing circuit to:
   obtain a target vector from a first plurality of financial transactions for a target party;
   obtain a time-dependent baseline vector from a second plurality of financial transactions for a plurality of parties, wherein the first plurality of financial transactions in the target vector include financial transactions for a current time period as well as financial transactions for a plurality of L previous time periods, and the second plurality of financial transactions in the baseline vector include financial transactions for the current time period as well as financial transactions for the same plurality of L previous time periods;
   train a Siamese neural network based on a plurality of sample transactions to detect differences between legitimate financial transactions and potentially money laundering financial transactions;
   generate a first output vector using the target vector as input to a first network of the Siamese neural network;
   generate a second output vector using the baseline vector as input to a second network of the Siamese neural network;
   obtain a vector distance between the first output vector and the second output vector;
   generate a drift score from the vector distance, the drift score indicative of how much the first plurality of financial transactions in the target vector vary from the second plurality of financial transactions in the baseline vector; and
   provide an alarm message if the drift score indicates potential fraudulent or money laundering activity by the target party.

14. The non-transitory computer-readable storage medium of claim 13, wherein the alarm message is provided only if the drift score and a plurality of immediately preceding drift scores for the same target party, in combination, indicate potential fraudulent or money laundering activity by the target party.

15. A server, comprising:
   at least one processor;
   a communication interface communicatively coupled to the at least one processor; and
   a memory communicatively coupled to the at least one processor,
   wherein the at least one processor is configured to:
      obtain a target vector from a first plurality of financial transactions for a target party;
      obtain a time-dependent baseline vector from a second plurality of financial transactions for a plurality of parties, wherein the first plurality of financial transactions in the target vector include financial transactions for a current time period as well as financial transactions for a plurality of L previous time periods, and the second plurality of financial transactions in the baseline vector include financial transactions for the current time period as well as financial transactions for the same plurality of L previous time periods;
      train a Siamese neural network based on a plurality of sample transactions to detect differences between legitimate financial transactions and potentially money laundering financial transactions;
      generate a first output vector using the target vector as input to a first network of the Siamese neural network;
      generate a second output vector using the baseline vector as input to a second network of the Siamese neural network;
      obtain a vector distance between the first output vector and the second output vector;
      generate a drift score from the vector distance, the drift score indicative of how much the first plurality of financial transactions in the target vector vary from the second plurality of financial transactions in the baseline vector; and
      provide an alarm message if the drift score indicates potential fraudulent or money laundering activity by the target party.

16. The server of claim 15, wherein each for the first network and the second network is a bidirectional long short term memory (LSTM) recurrent neural network.

17. The server of claim 15, the alarm message is provided only if the drift score and a plurality of immediately preceding drift scores for the same target party, in combination, indicate potential fraudulent or money laundering activity by the target party.

* * * * *